July 20, 1965

L. J. PRUNIER 3,195,197

LENS BLOCKING APPARATUS

Original Filed April 15, 1958

INVENTOR
LOUIS J. PRUNIER
BY James P. McAndrews
ATTORNEY

July 20, 1965
L. J. PRUNIER
3,195,197
LENS BLOCKING APPARATUS
Original Filed April 15, 1958
3 Sheets-Sheet 2
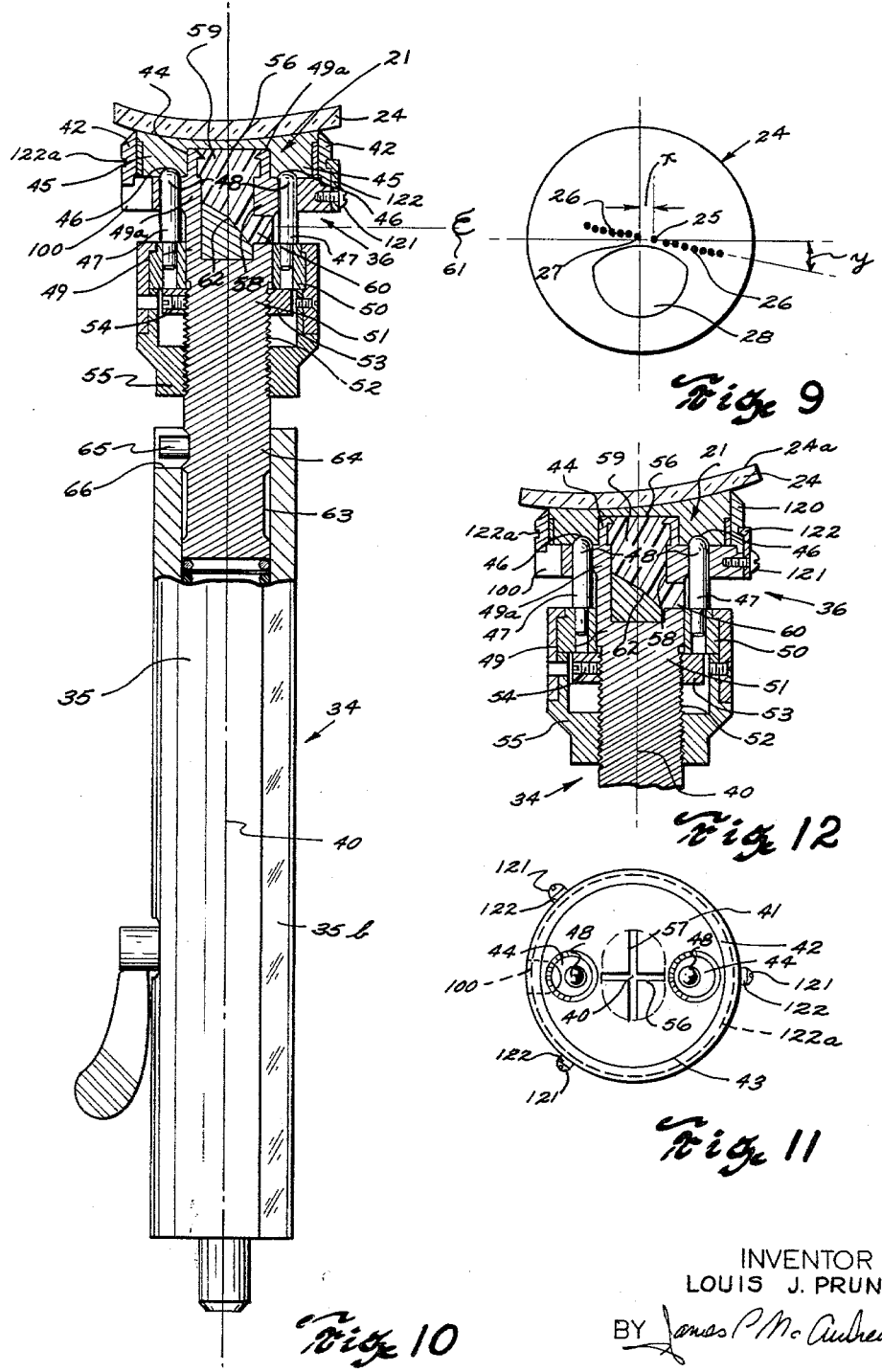
INVENTOR
LOUIS J. PRUNIER
BY James P. McAndrews
ATTORNEY

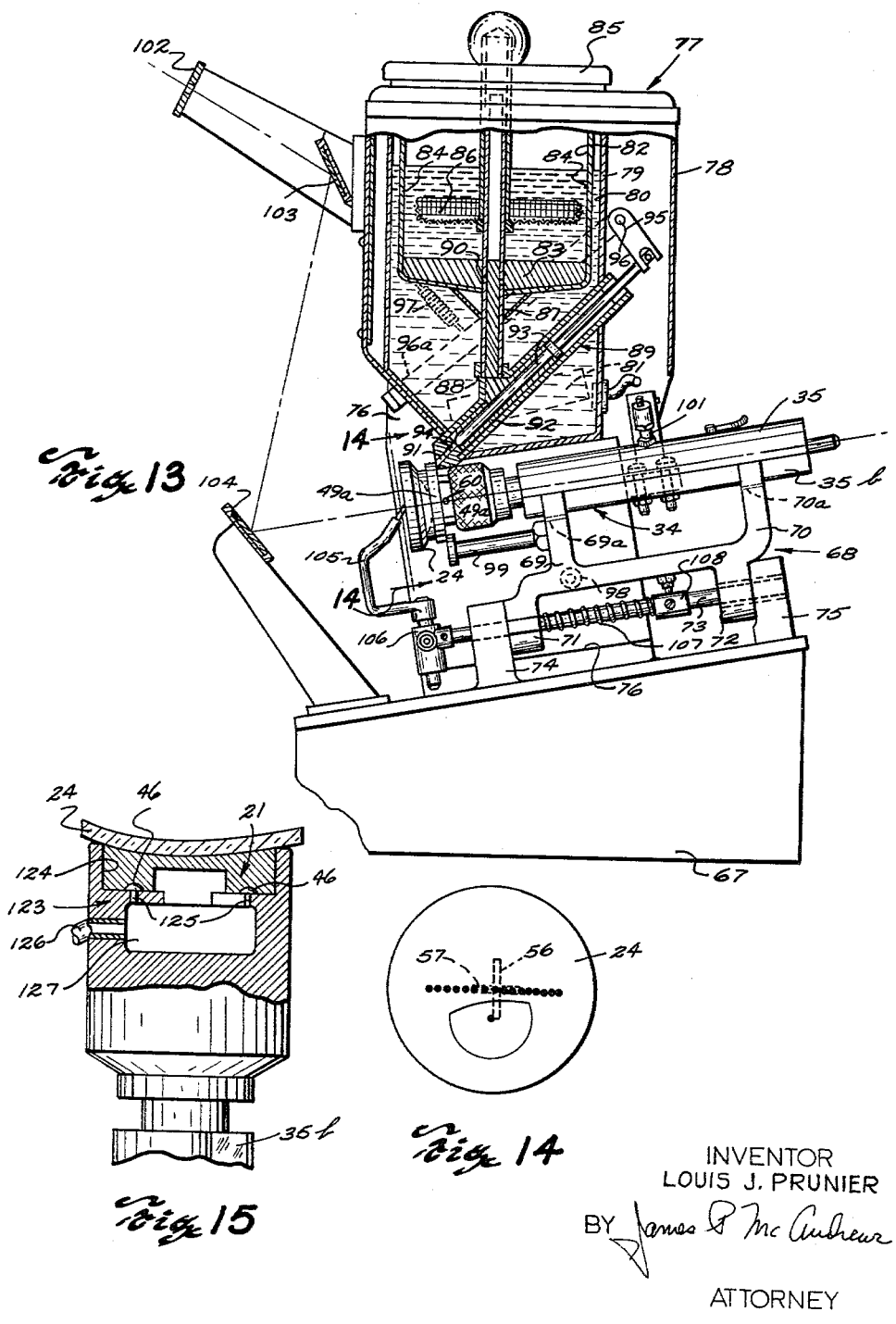

United States Patent Office 3,195,197
Patented July 20, 1965

3,195,197
LENS BLOCKING APPARATUS
Louis J. Prunier, Oxford, Mass., assignor to American Optical Company, Southbridge, Mass., a voluntary association of Massachusetts
Original application Apr. 15, 1958, Ser. No. 728,692, now Patent No. 3,118,198, dated Jan. 21, 1964. Divided and this application Apr. 8, 1963, Ser. No. 271,208
6 Claims. (Cl. 22—58)

This application is a division of my application, Serial No. 728,692, filed April 15, 1958, which has issued as U.S. Patent No. 3,118,198, dated January 21, 1964.

This invention relates to the blocking of lens blanks and has particular reference to the provision of improved lens blocks for holding lens blanks during the abrading thereof and means for forming said blocks and for attaching the same to the lens blanks.

In the processing of lens blanks, particularly of the multifocal type which are to be provided with toric surface curvatures on one or both of their sides, it is imperative that the major and minor axes of the toric surfaces be precisely on the cylinder axis desired and in the case of bifocals, properly aligned relative to the respective segment portions of the blanks in accordance with the prescriptive requirements of the finished lenses to be formed from the blanks.

In order to detachably support and maintain individual lens blanks in predetermined accurate alignment with the various pieces of apparatus usually required to perform the several operations necessary to produce finished optical surfaces of the above character on the blanks, it has been the practice heretofore to provide individual blocks formed of cast iron, steel, aluminum or the like and to attach each of the lens blanks to a respective block with a blocking medium such as pitch or other suitable adhesive.

While this practice has successfully provided means for accurately maintaining individual lens blanks in predetermined aligned relation with apparatus used to form the desired surface curvatures thereon, it has been found that lens blocks of the above character are relatively expensive to manufacture, require separate and precision assembly with the blanks and in order to be reusable, the blocks must be thoroughly cleaned upon completion of each surfacing operation to remove the pitch or other blocking medium which remains on their lens mounting surfaces after the lens blanks are removed therefrom. The cleaning of conventional lens blocks involves a tedious and time consuming task which in combination with the initial cost of the blocks, increases the overall expenditures required to manufacture prescriptive lenses or lens blanks of the above character.

The present invention provides not only improved apparatus by which lens blanks of the above character may be more economically manufactured but also novel lens blocks which, in addition to being formed in attached relation with the blanks, simultaneously insure accurate axial relation of said blanks with the means subsequently used in forming the desired finished optical surfaces thereon.

It is accordingly an object of the invention to provide simplified, highly effective and economical means for the precision blocking of lens blanks as well as new and improved lens blocks.

Another object is to provide an improved lens blocking technique including means for molding or otherwise forming individual lens blocks directly upon lens blanks which are to be surfaced and in proper axial position on said blanks.

Another object is to provide means for blocking lens blanks by forming lens blocks directly upon a side surface of the lens blanks which blocks are formed of a low melting metallic alloy characterized by the fact that when hardened it is adapted to withstand normal temperature changes incurred during conventional abrading operations without softening or otherwise distorting.

Another object is to provide novel means of blocking lens blanks by forming metallic blocks attached to the blanks without the use of conventional blocking materials and which blocks are simultaneously formed with connection means for detachable assembly with the abrading apparatus for forming the desired abraded surface on said blanks and for supporting said blanks in precision axial position during said abrading.

Another object is to provide lens blanks with rigid and relatively durable lens blocks formed of a metallic material which in itself will provide secure holding and aligning means for the lens blanks and which material is readily reusable upon completion of the lens blank surfacing operation.

Another object is to provide novel means for simultaneously blocking a lens blank and providing locating means on the lens block, which locating means is adapted to be subsequently accurately interfitted with axis aligning members of conventional lens surfacing devices so as to maintain a lens blank being surfaced in predetermined axially aligned relation with the lens forming tools of said devices.

A further object is to provide means for obviating the time-consuming block cleaning procedures common to conventional lens surfacing operations by forming lens blocks in attached relation with the blanks without the use of conventional blocking materials from a low melting blocking material of the above character which may be indefinitely repeatedly melted and reformed in accordance with the invention without requiring reconditioning of the material or incurring any appreciable loss of said material.

Other objects and advantages of the invention will become apparent from the following description when taken in conjunction with the accompanying drawings in which:

FIG. 9 is a face view of a marked lens blank which is typical of those to be blocked in accordance with the invention;

FIG. 10 is an enlarged longitudinal cross-sectional view of a part of the lens generating apparatus of FIG. 3 upon which is provided means for forming a lens block of the type embodying the invention and further means for receiving and aligning a lens blank which is to be attached to said block;

FIG. 11 is an end or face view of the lens block forming portion of the device of FIG. 10;

FIG. 12 is a fragmentary longitudinal cross-sectional view of a modified form of the device illustrated in FIG. 10;

FIG. 13 is a side elevational view, partially in section, of a blocking device which is used in conjunction with the apparatus of FIGS. 10 and 11 to carry out the method of the invention;

FIG. 14 is an enlarged view taken at a location indicated by line 14—14 of FIG. 13 and looking in the direction of the arrows; and FIG. 15 is a longitudinal cross-sectional view of a modified part of the generating apparatus of FIG. 3 which is adapted to receive lens blanks which have been blocked in accordance with the invention.

Figure 1:
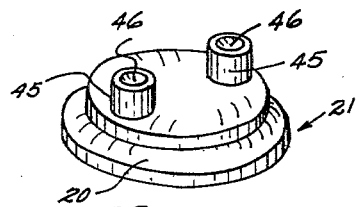
FIG. 1 is a perspective view of a blocked lens blank illustrating one type of lens block such as results from the practice of the invention.
Figure 3:
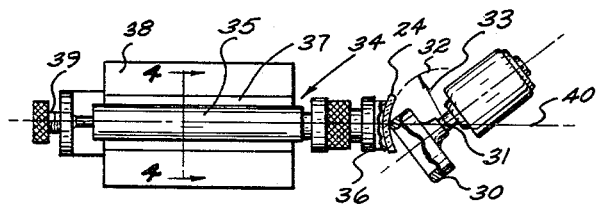
FIG. 3 is a diagrammatic illustration of one form of lens surface generating device used in the processing of lens blanks which have been blocked in accordance with the invention.
Figure 4:
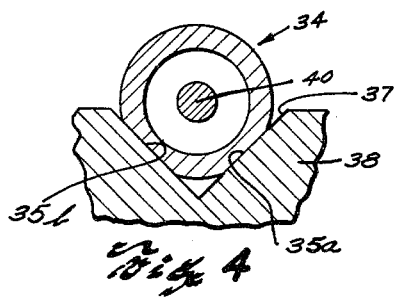
FIG. 4 is a fragmentary cross-sectional view taken on line 4—4 of FIG. 3.

In the drawings, wherein like characters of reference designate like parts throughout the various views there is shown in FIG. 1 a lens blank 20 attached to one type of a block 21 which has been formed on the lens blank 20 in accordance with the practice of the invention so as to provide holding and aligning means for detachably mounting the lens blank 20 in abrading relation with lens surfacing apparatus such as shown in FIGS. 3 and 4.

Figure 2:
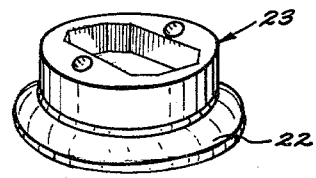
FIG. 2 is another perspective view of a blocked lens blank illustrating another type of lens block of the invention.

It will become apparent from the description to follow that the lens block 21 need not be restricted to the form shown in FIG. 1 but may be provided in various other shapes or configurations and a preferred modification of the block 21 is illustrated in FIG. 2 wherein a lens blank 22 is provided with a differently shaped block 23 also formed in accordance with the invention.

The lens blocking technique of the invention, which includes the blocks resulting therefrom, is designed and intended to carry out in a unique, more efficient and economical manner, the well-known procedure involved in providing lens blanks with prescriptive curvatures on one or both of their side surfaces and in proper axial position.

It is the general practice in the manufacture of lenses, to select lens blanks from stock which have been initially provided with an optically finished spherical surface on one of their sides and a semi-finished or "cleared" surface on their opposite sides. The optically finished curvature on a lens blank is generally referred to as its base curve and its opposite or semi-finished side is subsequently provided with a surface shape which is either spherical or toric and which, in combination with the base curve, index of refraction and resultant thickness of the finished lens, is such as to satisfy the prescriptive requirements of a particular individual to use the same.

It is the finishing of the second side of the lens blanks with which the present invention is primarily concerned, regardless of whether the second side is to be provided with a spherical shape or the more complex toric shape or whether the lens blanks are of the single vision or the multifocal type.

For purposes of best illustrating this invention, the more complicated process of finishing the second side of a bifocal lens blank which is to be provided with a toric surface will be discussed hereinafter.

In FIG. 9 there is shown a plan or face view of a bifocal lens blank 24 which has been marked in the conventional manner to indicate the point 25 at which the optical center of the lens blank is to be ultimately located and the dotted lines 26 indicate the direction in which the axis of cylinder curvature is to be provided on the lens blank 24.

It will be noted that for purposes of illustration, the segment part 28 of the lens blank 24 has been decentered a distance $x$ from the geometrical center 27 of the blank and the cylinder axis 26 of the toric surface to be provided on the blank is disposed at an angle $y$ relative to the horizontal axis of the blank.

Since in most instances, the segment part 28 is placed on the convex or plus side of a lens blank and the finished base curve is also provided on the plus side of the lens blank, the lens blank must be blocked on its plus side and finished by surfacing its concave or negative side. Such a case will be described hereinafter with reference to the lens blank 24 but it should be understood that in special cases wherein the base curve of a lens blank is provided on its concave side and its convex side is to be finished, the lens blank will of course be blocked on its concave side.

The first step in surfacing a lens blank which has been blocked is to rough generate or abrade the side thereof to be surfaced with apparatus of the general character shown in FIG. 3. While various types of machinery may be used for this purpose a machine of the type disclosed in detail in Patent No. 2,548,418 issued April 10, 1951 to D. P. Bernheim et al. will be discussed herein.

Referring more particularly to FIG. 3 it can be seen that a rotatable cupped type abrading tool 30 is provided to abrade the lens blank 24 by swinging across the face of the lens blank 24 about a pivot point 31 which is adjustably controlled to cause the abrading edge of the tool 24 to describe a curved path 32 having a radius of curvature 33 precisely that desired of the spherical or base curvature of the prescription toric surface to be provided on the concave side of the lens blank 24 and the diameter of the abrading face of the tool 30 is controlled to automatically and simultaneously produce the desired cylindrical curvature of the toric surface along a meridian normal to the meridian or axis of the spherical or base curvature. The lens blank 24 is held in abrading relation with the tool 30 by means of a block such as 21 or 23 (FIG. 1 or 2) which is securely held in predetermined axially aligned relation with the tool 30 by means of a work bar 34 having an elongated body part 35 and a chuck-like end part 36. The body part 35 of the work bar 34 is held securely in a magnetized V groove 37 formed in a stationary part 38 of the generating apparatus so as to cause the central longitudinal axis 40 of the work bar 34 to pass through the pivot point 31 of the tool 30. A longitudinally adjustable screw mechanism 39 is provided on the part 38 of the apparatus in such a manner as to engage the end of the work bar 34 opposite its chuck 36 and provide adjustable means for moving the work bar and lens blank 24 toward the tool 30 in accordance with the depth of cut desired on the lens blank which ultimately determines the final thickness of the finished lens blank.

It should be appreciated that with lens generating apparatus of the above character, the lens blank 24 must be accurately mounted in the chuck 36 with its optical center 25 precisely aligned coincident with the axis 40 which passes through the pivot point 31 of the tool 30 and the axis of cylinder curvature 26 of the lens blank must be aligned and held precisely in parallel relation with the plane in which the tool 30 swings about point 31.

Figure 6:
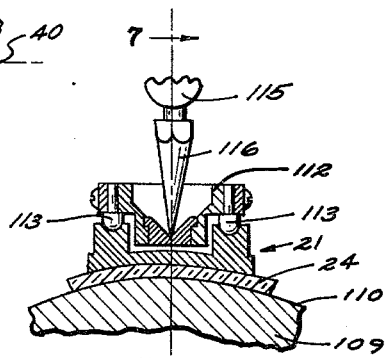
FIG. 6 is a fragmentary enlarged cross-sectional view taken through the apparatus of FIG. 5 substantially along line 6—6 thereof and looking in the direction of the arrows.
Figure 5:
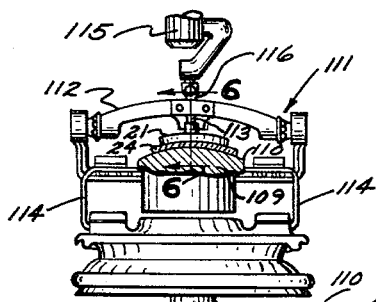
FIG. 5 is a diagrammatic illustration of means for finishing the generated surfaces of lens blanks in accordance with the invention.
Figure 7:
FIG. 7 is another fragmentary cross-sectional view of a part of the apparatus of FIG. 5 taken at a position which is indicated by line 7—7 of FIG. 6 and looking in the direction of the arrows.

In order to provide simple, efficient and highly accurate means for maintaining the lens blank 24 in the above mentioned alignment on the apparatus of FIG. 3 and in similarly aligned relation with the tool parts of other apparatus such as shown in FIGS. 5, 6 and 7 during subsequent finishing operations on the lens blank, the invention provides the improved lens blocks (21 or 23) which may be molded separately and applied to a work bar such as 34 or preferably formed directly on the work bar in the following manner.

Referring more particularly to FIGS. 10 and 11 wherein one form of the invention is illustrated which is adapted to provide lens blanks with blocks of the type illustrated in FIG. 1, the chuck-like end part 36 of the work part 34 is provided with a mold cavity 41 surrounded by an annular lens blank supporting ring 42 having a relatively thin or knife-like outer edge 43 adapted to receive the optically finished side surface of the lens blank 24 in the manner illustrated in FIG. 10. The cavity 41, which is shown filled with a block forming material in FIG. 10 and empty in FIG. 11, is provided with a pair of diametrically opposed inwardly extended recesses 44 which, when filled with a blocking material in the manner shown in FIG. 10, will form a block having a pair of diametrically opposed extensions 45 (FIGS. 1 and 10) each having a depression 46 therein, which extension 45 and depressions 46 are to function as axis aligning means for use in surfacing the lens blank in a manner to be described in greater detail hereinafter.

The depressions 46 are formed by pin members 47 which are each provided with an end part 48 of a shape complementary to that which is desired to be reproduced in the finished lens block. It will be noted that for purposes of illustration, the ends 48 of the pin members 47 are shown spherical in shape so as to ultimately provide the block 21 with concave spherically shaped depressions 46. However, it should be clear that the ends 48 of the pin members 47 could be made conical or provided with any other shape in accordance with that which is desired of the finally formed depressions 46.

The ends 48 of the pin members 47 extend through openings in the enlarged end 49a of a supporting part 49 of the chuck-like end 36 of the work bar 34, which part 49 forms the base of the mold cavity 41. The ends 48 of the pin members 47 protrude into their respective recesses 44 an amount sufficient to ultimately provide a full semi-circular depression in each of the extensions 45 of the finished block 21 which are of a depth therein substantially equal to the radius of curvature of the ends 48 of the pin members 47. The opposite ends of the pin members 47 are each press fitted or otherwise fixed in a floating collar 50 which is longitudinally slidable along an elongated necked-down portion 51 of the supporting part 49. Intermediate the ends of the supporting part 49, the necked-down portion 51 is provided with a threaded area 52 on which is mounted an internally threaded stop ring 53. The stop ring 53 is threadedly adjusted along the threaded area 52 to a position such as shown in FIG. 10 which will limit the extent to which the collar 50 and its attached pin members 47 may be drawn away from cavity 41 thus providing adjustable locating means for controlling the extent to which the ends 48 of pin members 47 may be permitted to extend into the recesses 44 of the mold cavity 41 when the collar 50 is fully retracted against the stop ring 53 as illustrated. When finally adjusted, the ring 53 is clamped to the part 49 by a set screw or the like 54. Also threadedly engaged upon the part 49 is a hollow sleeve 55 which is adapted to straddle the stop ring 53 and engage the annular edge parts of the collar 50 in the manner shown in FIG. 10 wherein the sleeve 55 will be free to rotate about the collar 50 but will carry the collar 50 longitudinally along the necked-down portion 51 of the part 49 when it is advanced along the threaded area 52 by being rotated about to the part 49. In order to align the cylinder axis 26 of a lens blank such as shown in FIG. 9 in aligned relation to an axis extending through the centers of the two diametrically opposed pin members 47 and to simultaneously align the center 25 of the lens blank with the central axis 40 of the work bar 34, indicia in the form of cross lines 56 and 57 are provided inside the mold cavity 41 on the uppermost surface 49a of the part 49. The line 56 is provided in accurately aligned relation with an imaginary line extending through the centers of the pin members 47 and the line 57 is located to extend in a direction normal to the line 56 and intersect the line 56 at a point through which the central axis 40 of the work bar extends (see FIG. 11). Thus, by placing the finished side of the lens blank 24 in contact with the supporting ring 42 and manually adjusting the lens blank to locate its optical center 25 coincident with the intersection of lines 56 and 57 and simultaneously aligning the axis 26 of the lens blank in parallel relation with the line 57, the lens blank is ready to be blocked. Since it is often times difficult to obtain a clear view of the indicia 56 and 57 through the material of a lens blank, particularly when shaded or colored lens blanks are used, the lines 56 and 57 are formed as slits which extend into a cavity 58 provided centrally within the member 49. In this instance the cavity 58 is filled with a transparent light-transmitting plastic or the like 59 and a communicating opening 60 is provided through the side wall of the part 49 through which light may be projected from an external source 61 (FIG. 10) into the plastic 59. An inclined reflecting surface 62 is provided on the plastic at its end which is adjacent the communicating opening 60 to direct the light outwardly through the plastic material and slits which form the lines 56 and 57 and thus illuminate the lines 56 and 57 so as to render the same more readily visible through the lens blank.

Because the work bar 34 is not only used to block the lens blank but is also used to support the lens blank during the generating of its surface curvature with the apparatus of FIG. 3, it is pointed out that the chuck-like end part 36 of the work bar 34 is accurately fitted into one end of the elongated body part 35 with the central axes of both parts 35 and 36 in coincident relation with each other. A tapered opening 63 is provided in the body part 35 into which the tapered end 64 of the chuck part is accurately fitted. In order to cause the imaginary line extending through centers of the pin members 47 (which imaginary line is in normal relation with the cylinder axis 26 of a lens blank mounted on the chuck part 36) to be disposed in normal relation to the direction or plane in which the tool 30 (FIG. 3) swings about point 31 as discussed above, the body part 35 of the work bar is provided with a pair of flat sides 35a and 35b (FIG. 4) which locate the work bar in the V groove 37 of the apparatus of FIG. 3 and prevent the work bar 34 from rotating therein during a generating operation. The tapered end 64 of the chuck part 36 is provided with a locating pin 65 which keys into a mating slot 66 in the body part 35. The slot 66 and pin 65 are so located relative to the flats 35a and 35b as to automatically properly align the above-mentioned imaginary line which extends through the pin members 47 relative to the tool 30 when the chuck 36 and body parts 35 of the work bar 34 are assembled as illustrated in FIG. 10 and positioned on the apparatus of FIG. 3 in the manner illustrated more particularly in FIG. 4.

The blocking of the lens blank 24 on the work bar 34 is accomplished with the apparatus of FIG. 13 which comprises a base 67 upon which is mounted a support, generally indicated by numeral 68, for holding a work bar 34 upon which a lens blank 24 is to be mounted. The support 68 embodies a pair of spaced upstanding parts 69 and 70 each of which are provided with V grooves 69a and 70a respectively in which the work bar 34 is rested during the blocked operation. The V grooves 69a and 70a are identical in cross-sectional shape to the above mentioned V groove 37 of the generating apparatus of FIG. 3 so that the flat sides 35a and 35b of the work bar 34 will seat against the sides of the V grooves 69a and 70a and locate the work bar 34 in a position on the blocking apparatus simulating the position it assumes when placed in abrading relation with the apparatus of FIG. 3. The support 68 is further provided with depending bearing parts 71 and 72 which are pivotally connected by a rod 73 to a pair of bosses 74 and 75 which are integrally formed with or otherwise secured to the base 67. To one side of the support 68 there is provided on the base 67 an upstanding bracket 76 upon which is mounted a dispensing apparatus 77 having means for storing and dispensing a liquefied blocking medium which is used to fill the mold cavity 41 in the work bar 34. The dispensing apparatus embodies an outer supporting shell or enclosure 78 formed of sheet metal or the like rigidly secured to the bracket 76, which supports a tank 79 containing a supply of water 80 which is heated by means of conventional submersible electrical heating elements or the like 81. Within the tank 79 there is provided a second tank or container 82 in which is provided a supply of blocking material 83. The container 82 extends a considerable distance below the upper water level of the tank 79 which is usually maintained at approximately the location illustrated in FIG. 13 and openings 84 are provided in the container 82 to allow the water 80 to circulate therein as illustrated.

The blocking material 83 which may consist of any substance such as plastic or metal alloy material having the characteristics of a low temperature melting metallic alloy known to the trade as "Cerro-low" or "Cerro-bend" manufactured and sold by Cerro de Pasco Co. is placed in the container through its upper open end which is provided with a cover 85 having a wire basket 86 or the like attached thereto. By lifting the basket 86 out of the water along with the cover 85, pieces of solid blocking material such as previously formed blocks or the like which have been removed from finished lens blanks may be placed in the basket and lowered into the water 80 which is heated by heating elements 81 to a temperature sufficient to melt the solid blocking material. When the solid blocking material is melted by the heat of the water 80, it will run through the weave of the basket 86 and collect in the bottom of the container 82 in the manner shown in FIG. 13. Being heavier than water it will, of course, displace any water which might be in the bottom of the container 82. If for any reason pieces of glass, paper or other foreign material happen to be attached to the solid blocking material when it is deposited in the basket 86, it can be seen that when melted in the basket, the blocking material will flow through the weave of the basket and substantially all of the foreign material will be left in the basket 86 where it may be easily removed. An outlet is provided for the melted blocking material 83 in the bottom of the container 82 and this outlet is in the form of a pipe or tubular member 87 extending vertically substantially throughout the length of the container 82 and down into the lower part of the tank 79 where it is connected by a fitting 88 to a valve mechanism 89 also mounted within the internal lower part of the tank 79. It will be noted that the upper part of the tubular member 87 functions as a guide means for supporting the basket 86 centrally within the container 82 and the tubular member 87 is provided with openings 90 adjacent the bottom of the container 82 which allow the melted blocking material 83 to flow downwardly from the container 82 through the tubular member 87 and into the valve mechanism 89. The valve mechanism 89 is provided with a nozzle 91 which extends forwardly and outwardly of the enclosure 78. Within the bore 92 of the valve mechanism 89 there is provided a longitudinally adjustable plunger 93 which is normally in the position indicated in FIG. 13 where its lowermost end part closes the exit opening 94 through the nozzle 91. The plunger 93 is held in closed relation with the nozzle 91 by means of an actuating mechanism embodying a relatively short lever arm 95 which is linked with the uppermost end of the plunger 93 and fixed to a shaft 96 which is rotatably mounted in the enclosure 78. An operating lever 96a which is directly, rigidly connected to shaft 96, extends forwardly of the apparatus of FIG. 13 to a location slightly above the nozzle 91 and is spring biased in an upward direction by a coil spring 97 to normally urge the plunger 93 against the exit opening 94 of the nozzle 91. By moving the forward end of the lever 96a downwardly toward the nozzle 91 against the tension of the spring 97, it can be seen that the lever arm 95 will be rotated counterclockwise as viewed in FIG. 13 and the plunger 93 will be drawn away from the exit opening 94 of the nozzle 91 to allow the blocking material 83 to flow outwardly through the nozzle 91.

It will be noted that all parts of the container 82, tubular member 87 and valve mechanism 89, in which the blocking material 83 is located, are completely surrounded at all times with the water 80 which is maintained at a temperature sufficient to keep the blocking material 83 in its melted state and free flowing. It should also be appreciated that since the blocking material can be completely melted or liquefied at a temperature ranging between approximately 117° to 156° Fahrenheit which is approximately the temperature to which the water is heated, an operator of the blocking mechanism is completely safe from injury even though he may accidentally have physical contact with the melted blocking material or the water in the container 79.

In order to block a lens blank on a work bar 34 with the apparatus of FIG. 13, the support 68 is first swung outwardly in a sidewise direction away from the nozzle 91 by pivoting the same about the rod 73 whereupon the work bar 34 is placed in the V grooves 69a and 70a thereof in the manner disclosed above with its flat parts 35a and 35b seated against the respective sides of the V grooves. By swinging the support 68 outwardly in this manner the work bar 34 may be quickly and easily properly placed in the V grooves 69a and 70a. The support 68 is next swung back toward the nozzle 91 against a stop 98 which projects outwardly of the bracket 76. The stop 98 is preferably in the form of a screw or the like which is threadedly adjustable in the bracket 76 but adapted to be locked by a lock nut or the like, not shown, so as to extend from the bracket an amount sufficient to locate the exit opening 94 in the nozzle 91 directly above the longitudinal axis of the work bar when the support 68 is in contact with the stop 98.

After the support 68 is positioned against the stop 98, the work bar 34 is moved in the direction of its longitudinal axis along the V grooves 69a and 70a to a position where the enlarged end part 49a of the work bar contacts a second stop 99 in the manner illustrated in FIG. 13. The second stop 99 is fixed to the upstanding part 69 of the support 68 and function cooperatively with the stop 98 to locate an opening 100 (see FIG. 10), in the part 49a which communicates with the mold cavity 41, in accurate alignment with the nozzle 91 so as to permit the blocking material 83 to flow from the nozzle 91 directly into the mold cavity 41 when the lever 96a is operated as mentioned above.

After the support 68 and work bar 34 have been adjusted relative to the stops 98 and 99 as described above, a clamp member 101 carried by the bracket 76 is clamped tightly against the body part 35 of the work bar to hold it and the support 68 securely in the above-mentioned aligned relation with the nozzle 91.

A lens blank 24 to be blocked is then placed against the supporting ring 42 and aligned relative to the lines or indicia 56 and 57 so as to have its optical center 25 aligned on axis with the point of intersection of the indicia 56 and 57 and its cylinder axis 26 also aligned with the line or indicia 57 in the manner disclosed in detail hereinabove and shown in FIG. 14. Sighting means embodying a peep sight 102 and a pair of plane reflecting mirrors 103 and 104 are provided on the base 67 and the enclosure 78 to aid in accurately aligning the lens blank with the indicia 56 and 57 and to overcome the effects of parallax which might result from the spacing between the indicia 56 and 57 and the alignment markings 25 and 26 on the lens blank.

If the indicia 56 and 57 are not normally clearly visible through the lens blank 24, a light may be directed into the opening 60 so as to illuminate the indicia 56 and 57 which are formed as slits through the base of the mold cavity 41.

When the lens blank 24 is accurately aligned with the indicia 56 and 57 on the work bar 34, a spring urged clamp arm 105 is placed against the outer surface of the lens blank 24 to hold it securely against the supporting ring 42 of the work bar 34. The clamp arm 105 is attached with a swivel connection 106 to the forward end of the rod 73 and a spring 107 which is placed under compression between a stop member 108 carried by the rod 73 and the adjacent side of the bearing part 71. The spring forcefully urges the clamp arm 105 against the lens blank 24.

The mold cavity is next filled with the blocking material 83 by depressing the lever 96a so as to open the valve mechanism 89 and allow the blocking material to flow through the nozzle 91 directly into the cavity 41 through the communication or opening 100 therein. When the mold cavity 41 is completely filled the lever 96a is released to stop the flow of blocking material.

Referring more particularly to FIG. 10, the blocking material is such that when the mold cavity is filled and as the said material hardens it not only becomes attached to the lens blank but also forms the block for the blank and it is simultaneously provided with the recesses 46 therein. The said recesses being in proper positional relation with the cylinder axis of the surface to be formed on the blank.

When the blocking material 83 has cooled and becomes solidified in the mold cavity 41 in the clamp arm 105 and the clamp member 101 are released and the support 68 is swung away from the nozzle 91 whereupon the work bar 34 is lifted from the support 68.

It is pointed out that cooling means such as circulating cold water or the like could be applied to the outer part of the mold cavity 41 to provide a more rapid cooling and hardening of the blocking material 83. However, it has been found that with the apparatus shown and described, the material 83 will harden relatively quickly without applying a coolant at the blocking station and will not cause any appreciable delay in removing the work bar from the blocking apparatus.

After the lens blank 24 is blocked to the work bar 34 and the bar 34 has been removed from the apparatus of FIG. 13 it is placed on the apparatus of FIG. 3 and the exposed surface of the lens blank is generated in the manner disclosed in detail hereinabove. It is pointed out that during the generating of the lens blank surface, a coolant is applied to the lens blank which flows over the mold part of the work bar. This coolant provides a final cooling of the mold and lens block formed therein while simultaneously dissipating the heat produced by the generating of the lens blank surface.

Following the operation which is performed by the apparatus of FIG. 3 the lens blank and its attached block 21 are ejected as a unit from the mold cavity 41 in the work bar 34 by rotating the sleeve 55 in a direction which will cause it to advance along the threaded area 52 toward the mold cavity 41. In so doing, the collar 50 which is carried by the sleeve 55 will cause the pin members 47 to force the block 21 and its attached lens blank 24 out of, and away from the cavity 41.

Upon removal from the work bar 34, the generated surface of the blocked lens blank 24 is optically finished by fine grinding and polishing operations which are performed on surfacing apparatus of the type diagrammatically illustrated in FIGS. 5, 6 and 7 in which a forming tool or lap 109 is provided with a lens blank forming surface 110 which is accurately shaped to the curvature desired on the surface of the lens blank 24. A resilient aligning mechanism 111, which embodies a yoke member 112 having a pair of depending axis aligning pins 113 therein, is supported over the lap 109 by resilient arm parts 114 so as to cause an axis through the pins 113 to be held at all times in precise parallel alignment with the spherical axis of the curvature provided on the surface 110 of the lap 109 while permitting the yoke 112 to be moved about the surface 110 of the lap by operation of a crank arm 115 which is provided with a drive pin 116 sealed in a recess which is disposed centrally in the yoke 112. By placing the lens blank directly upon the surface 110 of the lap 109 is illustrated, and causing the pins 113 to engage in the recesses 46 which have been formed in the block 21 attached thereto, the spherical axis which has been generated by the apparatus of FIG. 13 will be accurately aligned parallel to the spherical axis of the curvature of surface 110. The finish abrading and polishing of the lens blank 24 is brought about in a well-known manner by applying a suitable abrading or polishing medium between the engaging surfaces of the lens blank 24 and lap 109 while moving either the lens blank or the lap, or both, relative to each other.

It should be clear that the lens block 21 not only replaces the conventional cast iron type of lens block which must be attached to a lens blank with pitch or the like, but also provides axis aligning means in the form of recesses 46 which are simultaneously formed in one operation with the forming of the block.

Upon completion of the polishing operation the lens blank 24 is removed from the block by simply squeezing the sides of the block together with a suitable tool so as to distort its shape slightly. This will cause the lens blank to be immediately released. Alternatively, the blank may be removed from the block by shocking the blocked lens blank with a slight but sharp blow or, the material of the block can be melted away from the blank. It is preferable, however, to deblock by following the first mentioned method of squeezing and distorting the lens block.

After each deblocking operation, the material of the used block is reclaimed and rendered reusable by placing it in the heated water 80 of the blocking mechanism as discussed above. In this manner no waste of the blocking material is incurred and it is pointed out that the technique of the invention overcomes the usual expense of replacing worn or damaged blocks since the blocks of the invention are only used to carry out one lens blank surfacing procedure whereupon they are melted and reformed each time a lens blank is blocked.

Figure 8:
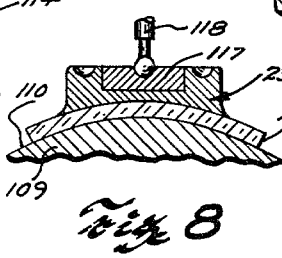
FIG. 8 is a cross-sectional view of a blocked lens blank of the type illustrated in FIG. 2 shown in a position of use.

It should be clearly understood that the shape of the lens blocks and location of the aligning recesses 46 therein are entirely dependent upon the type of mold in which they are formed and the mold may be designed to form blocks which would be adaptable to lens surfacing apparatus of types other than these illustrated herein. For example, if the second or unfinished side of stock lens blanks were to be provided with spherical curvatures only, the blocks would preferably be formed with only one central recess which would be used to receive the drive pin 116 of a surfacing machine such as shown in FIGS. 5 through 7 or a lens block 23 such as shown in FIG. 2 could be provided with an insert 117 in the manner illustrated in FIG. 8 wherein the drive pin 118 would engage the center of the block 23.

In FIG. 12 the work bar 34 of FIG. 9 is illustrated as embodying means for blocking lens blanks which are to ultimately be provided with a prescriptive prism correction. That is, where one side of a lens blank is to be finished thicker than its diametrically opposed side along a predetermined axis through the optical center of the lens blank. It will be noted that the annular lens blank supporting ring 42 of FIG. 10 has been replaced by another lens supporting ring 120 which is constructed to be higher at one side than it is at its diametrically opposed side so as to cause the general plane of the lens blank 24a to be inclined relative to the longitudinal axis of the work bar 34 an amount in accordance with the difference in height of the above mentioned diametrically opposed sides of the ring 120. It is evident that by blocking a lens blank 24a on the work bar 34 in this tilted or inclined manner that more material will be removed from its highest side than will be removed from its lowest side when the concave surface thereof is curve generated with the apparatus of FIG. 3 and this will introduce the abovementioned prism effect in the generated lens blank.

Several rings 120 are provided with various degrees of inclined lens mounting edges in accordance with the degree of prism correction desired of the finished lens blank and are readily and quickly replaceable upon the work bar 34. Rings 120 and 42 are each provided with an annular groove 122a into which L-shaped clamps 122 are fitted as shown in FIGS. 10 and 12 and the clamps 122 are secured to the enlarged end 49a of the supporting part 49 of the chuck 36. In this manner, the ring 120 may be rotated about its axis.

The ring 120 which is rotatably mounted on the work bar is rotated an amount sufficient to align an axis extending between the highest and lowest points on the ring 120 with respect to the indicia 56 and 57 so as to determine the axis along which the prism correction will be directed. This is done in accordance with the prescriptive requirements of the particular lens blank being blocked.

When the ring 120 is properly rotationally aligned on the work bar 34, the lens blank 24a is blocked in exactly the same manner as the lens blank 24 which was discussed previously.

It should be appreciated that the blocks and lens blanks attached thereto may be ejected from the work bar 34 of FIG. 13 immediately following a blocking operation and applied to other work bars such as shown in FIG. 15 for performing the lens blank surface generating operation illustrated by FIG. 3.

The work bar of FIG. 15 is provided with a vacuum chuck 123 which is provided with a cavity 124 of substantially the same outer contour shape as the lens block 21 and is further provided with aligning pins 125 which are adapted to engage the recesses 46 of the block 21 when the block 21 is fitted into the cavity 124. A vacuum line 126 is directed into a hollow area 127 behind the cavity 124 and by continually evacuating the air from the area 127 by known means, the lens block will be held securely in aligned relation with the work bar during a surface generating operation.

It is also pointed out that the blocking mechanism, FIG. 13, may be provided with a permanent blocking mold to replace the apparatus which supports the work bar 34. In such a case, the lenses would be blocked and then ejected from the mold whereupon they would next be applied to a work bar such as shown in FIG. 15 for subsequent processing.

While it has been described above that the block is formed in direct contact with the lens blank, in instances when a metal is used, the side surface of the lens blank to be blocked may be initially provided with a relatively thin, preferably transparent, coating of plastic material such as polyvinyl chloride or the like. The block in such an instance is formed in contact with the plastic coating which is initially brushed on to the surface of the blank.

The plastic material is such that while it provides a good bond between the blank and block it may be peeled off the surface of the blank or block without leaving any residue thereon after the blank has been surfaced and removed from the block.

From the foregoing, it will be seen that improved simplified and economical means have been provided for accomplishing all of the objects and advantagse of the invention. However, it should be apparent that many changes in the details of construction, arrangement of parts and steps of the invention may be made by those skilled in the art without departing from the spirit of the invention as expressed in the accompanying claims and the invention is not to be limited to the exact matters shown and described herein as only the preferred matters have been given by way of illustration.

Having described my invention, I claim:

1. Apparatus for blocking lens blanks comprising mold means for forming a lens block, said mold means having an open ended cavity therein contoured to define the shape desired of that part of a block to be attached to a lens blank which is to be gripped by lens blank processing means, a lens blank receiving seat extending peripherally about the open end of said cavity for receiving a side surface of said lens blank, indicia within said cavity with which said lens blank may be aligned when positioned on said seat, means protruding into said cavity in predetermined aligned relation with said indica to provide recessed locating means on said block for use in locating said lens blank in said lens blank processing means subsequent to blocking of said blank, said mold means having an opening through a side thereof giving access to said cavity when said side of said lens blank is placed on said seat for permitting a block forming material to be introduced into said cavity to form said block in connected relation with said side of said lens blank and means for ejecting said block from the open end of said mold means subsequent to its being formed therein.

2. Apparatus for blocking lens blanks comprising mold means for forming a lens block, said mold means having an open ended cavity therein contoured to define the shape desired of that part of a block to be attached to a lens blank which is to be gripped by lens blank processing means, a continuous lens blank receiving seat extending peripherally about the open end of said cavity for receiving a side surface of said lens blank, indicia within said cavity with which said lens blank may be aligned when positioned on said seat, means for releasably holding said lens blank in said aligned position on said seat, means protruding into said cavity in predetermined aligned relation with said indicia to provide recessed locating means on said block for use in locating said lens blank in said lens blank processing means subsequent to blocking of said blank, said mold means having an opening through a side thereof giving access to said cavity when said side of said lens blank is placed on said seat for permitting a flowable block forming material to be introduced into said cavity, means for containing and dispensing a supply of said block forming material, supporting means for said containing and dispensing means and means for positioning said opening in said mold means in predetermined aligned relation beneath said dispensing means, means for actuating said dispensing means to permit said block forming material to flow downwardly through said opening and into said cavity to form said block in connected relation with said side of said lens blank and means in said mold means for ejecting said block from the open end of said cavity subsequent to its being formed therein.

3. Apparatus for blocking lens blanks comprising mold means for forming a lens block, said mold means having an open ended cavity therein contoured to define the shape desired of that part of a block to be attached to a lens blank which is to be gripped by lens blank processing means, a lens blank receiving seat extending peripherally about the open end of said cavity for receiving a side surface of said lens blank, indicia within said cavity with which said lens blank may be aligned when positioned on said seat, means within said mold means for permitting said indicia to be illuminated, adjustable means protruding into said cavity in predetermined aligned relation with said indicia to provide recessed locating means on said block for use in said lens blank processing means said lens blank subsequent to blocking of the blank, said adjustable means being contoured to the shape desired of said locating means, said mold means having an opening through a side thereof giving access to said cavity when said side of said lens blank in placed on said seat for permitting a block forming material to be introduced into said cavity to form said block in connected relation with said side of said lens blank and means for advancing said adjustable means into said cavity an amount sufficient to eject said block from the open end of said mold means subsequent to its being formed therein.

4. A work bar for blocking and supporting lens blanks to be abraded comprising an elongated body member, locating surfaces on said body member for use in locating the body member in a lens blank processing means, and mold means on one end of said body member for blocking a lens blank to said work bar, said mold means having an open ended cavity therein contoured to define the shape desired of that part of a block to be attached to a lens blank which is to be gripped by another lens blank processing means, said cavity having its central axis aligned with the longitudinal axis of said body member, a continuous lens blank receiving seat extending peripherally about the open end of said cavity for receiving a side surface of a lens blank to be blocked, indicia within said cavity with which said lens blank may be aligned when positioned on said seat, means protruding into said cavity in predetermined aligned relation with said indicia to provide recessed locating means on said block when formed in said cavity for use in locating said lens blank in said other lens blank processing means subsequent to blocking of the blank, said mold means having an opening through a side thereof giving access to said cavity, when said side of said lens blank is placed on said seat for permitting a flowable block forming material to be introduced into said cavity to form said block in connected relation with said side of said lens blank and means in said mold means for releasing said block and attached lens blank from said work bar whereby said lens blank can be successively located in lens blank processing means by reference to said body member and to said block.

5. Apparatus for blocking lens blanks comprising mold means for forming a lens block, said mold means having an open ended cavity therein contoured to define the shape desired of that part of a block to be attached to a lens blank which is to be gripped by lens blank processing means, a lens blank receiving seat extending peripherally about the open end of said cavity for receiving a side surface of said lens blank, adjustable means protruding into said cavity in predetermined aligned relation with said indicia to provide recessed locating means on said block for use in locating said lens blank in said lens blank processing means subsequent to blocking of the blank, said adjustable means being contoured to the shape desired of said locating means, said mold means having an opening through a side thereof giving access to said cavity when said side of said lens blank is placed on said seat for permitting a block forming material to be introduced into said cavity to form said block in connected relation with said side of said lens blank and means for advancing said adjustable means into said cavity an amount sufficient to eject said block from the open end of said mold means subsequent to its being formed therein.

6. Apparatus for providing a lens block on a lens blank comprising mold means having a mold cavity open at one end in which a rigid lens block is adapted to be formed, said cavity being contoured to mold a substantial part of the desired shape of a lens block formed therein including that part of said lens block subsequently to be held by lens blank processing means, said cavity being contoured to release a rigid lens block molded therein from within said cavity, said mold means having a lens blank receiving seat about said open cavity end for receiving one side of said lens blank so that said blank cooperates with said mold cavity to define the remainder of the desired shape of said lens block, said mold means having an opening giving access to said mold cavity when said lens blank is placed on said seat, and means for introducing block forming material into said cavity to form a lens block having said desired shape in connected relation with said side of said lens blank.

References Cited by the Examiner
UNITED STATES PATENTS 2,465,153 3/49 Fritzsche _____ 51—277
2,781,547 2/57 Moxness _____ 18—30
2,930,130 3/60 Ray et al. _____ 51—277

MICHAEL V. BRINDISI, *Primary Examiner.*